(12) United States Patent
Ichikawa

(10) Patent No.: US 9,617,442 B2
(45) Date of Patent: Apr. 11, 2017

(54) PUNCTURE SEALING AGENT

(71) Applicant: SUMITOMO RUBBER INDUSTRIES, LTD., Kobe-shi, Hyogo (JP)

(72) Inventor: Naoya Ichikawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/411,057

(22) PCT Filed: Jun. 26, 2013

(86) PCT No.: PCT/JP2013/067436
§ 371 (c)(1),
(2) Date: Dec. 23, 2014

(87) PCT Pub. No.: WO2014/003028
PCT Pub. Date: Jan. 3, 2014

(65) Prior Publication Data
US 2015/0337155 A1  Nov. 26, 2015

(30) Foreign Application Priority Data
Jun. 27, 2012  (JP) .................. 2012-144518

(51) Int. Cl.
*C09D 107/02* (2006.01)
*B29C 73/16* (2006.01)

(52) U.S. Cl.
CPC .......... *C09D 107/02* (2013.01); *B29C 73/163* (2013.01)

(58) Field of Classification Search
CPC ........................ C09D 107/02; B29C 73/163
See application file for complete search history.

(56) References Cited

U.S. PATENT DOCUMENTS

| | | | | |
|---|---|---|---|---|
| 4,265,807 A | * | 5/1981 | Breslow | .................. C09F 1/04 530/219 |
| 6,063,837 A | | 5/2000 | Kawamura et al. | |
| 2004/0048962 A1 | * | 3/2004 | Kojima | ................. B29C 73/163 524/386 |
| 2008/0306197 A1 | * | 12/2008 | Yanagi | ................. B29C 73/163 524/386 |
| 2011/0207848 A1 | * | 8/2011 | Hirata | ................. B29C 73/163 523/166 |
| 2012/0041099 A1 | * | 2/2012 | Takahara | ............. B29C 73/163 523/166 |

FOREIGN PATENT DOCUMENTS

| | | |
|---|---|---|
| JP | 10-217344 A | 8/1998 |
| JP | 2005-120273 A | 5/2005 |
| JP | 2011-006645 A | 1/2011 |
| JP | 2013-166892 A | 8/2013 |
| WO | WO 2006/049171 A1 | 5/2006 |

OTHER PUBLICATIONS

Rao, X.; Rosin-based Chemicals and Polymers, Chapter 5: Synthesis and Applications of Rosin-Based Surfactants, 2012, p. 129-172.*
International Search Report issued in PCT/JP2013/067436, dated Oct. 1, 2013.

* cited by examiner

*Primary Examiner* — Robert Jones, Jr.
(74) *Attorney, Agent, or Firm* — Birch, Stewart, Kolasch & Birch, LLP

(57) ABSTRACT

Provided is a tire puncture sealant having improved puncture sealing performance while showing excellent storage stability. The present invention relates to a tire puncture sealant including: rubber latex, a tackifying resin emulsion, and a rosin acid surfactant.

2 Claims, No Drawings

PUNCTURE SEALING AGENT

TECHNICAL FIELD

The present invention relates to a puncture sealant having enhanced puncture sealing performance for use in puncture repair systems which sequentially inject a puncture sealant and high-pressure air into a punctured tire through an air valve on the tire wheel.

BACKGROUND ART

Known systems for temporarily repairing a punctured tire include those in which a sealant is injected through an air valve on a tire after the valve core is removed, the valve core is installed after injection, and high-pressure air is then injected until the tire is pumped up to a sufficient pressure for driving (hereinafter referred to also as "discrete systems"); and those which include a pressure-proof container containing a sealant, and a high pressure-air source such as a compressor, to inject the sealant into a tire through the air valve and subsequently continuously inject high-pressure air until the tire is pumped up to a sufficient pressure for driving (hereinafter referred to also as "integrated systems"). Such puncture sealants need to have excellent storage stability and puncture sealing performance, etc.

For example, Patent Literature 1 proposes a puncture sealant prepared by adding a surfactant, such as a polyoxyalkylene alkyl ether, to natural rubber latex. However, there is still room for improvement in terms of improving puncture sealing performance while providing storage stability.

CITATION LIST

Patent Literature

Patent Literature 1: JP 2011-6645 A

SUMMARY OF INVENTION

Technical Problem

It is an object of the present invention to solve the above problems and provide a tire puncture sealant having improved puncture sealing performance while showing excellent storage stability.

Solution to Problem

The present invention relates to a tire puncture sealant, including: rubber latex, a tackifying resin emulsion, and a rosin acid surfactant.

The puncture sealant preferably includes an antifreezing agent.

In the puncture sealant, the rosin acid surfactant is preferably contained in an amount of 0.1 to 15 parts by mass for each 100 parts by mass of rubber solids in the rubber latex.

The rosin acid surfactant is preferably a disproportionated rosin acid surfactant The rubber latex is preferably natural rubber latex.

Advantageous Effects of Invention

The present invention involves the addition of a rosin acid surfactant to a tire puncture sealant containing rubber latex and a tackifying resin emulsion, and thereby improves puncture sealing performance while providing excellent storage stability.

DESCRIPTION OF EMBODIMENTS

The tire puncture sealant of the present invention contains rubber latex, a tackifying resin emulsion, and a rosin acid surfactant.

Common puncture sealants contain surfactants derived from synthetic rubber latex and a tackifying resin emulsion as well as surfactants added to improve storage stability (storage properties), etc., and thus are overstabilized by these surfactants. This increases the time from the start of driving with a tire refilled with air to the completion of sealing of the tire. In contrast, the puncture sealant of the present invention contains a rosin acid surfactant added as a surfactant and thereby not only shows good storage stability (storage properties) but also has a reduced time required for sealing, resulting in significantly improved puncture sealing performance.

Examples of the rubber latex include natural rubber latex and synthetic rubber latex. In particular, the puncture sealant according to the present invention may suitably include natural rubber latex as a main component in view of the following properties: for example, the puncture sealant can be injected into a tire without clogging the valve; the puncture sealant is allowed to rapidly fill a puncture hole by driving and then solidified by receiving mechanical stimuli due to the deformation of the tire, so as to seal the puncture hole (initial sealing performance); and the puncture sealant can maintain sealing performance up to a certain travel distance (seal retention performance).

In particular, so-called deproteinized natural rubber latex, which is obtained by deproteinizing such natural rubber latex, may be more preferably used in view of the additional fact that deproteinized natural rubber latex can be prevented from decaying with a smaller amount of ammonia, and therefore corrosion damage to steel cords and generation of a pungent odor, both caused by ammonia, can be prevented. The deproteinized natural rubber latex may be prepared for example by adding a proteolytic enzyme to natural rubber latex to degrade the proteins, followed by washing, as described in JP-A H10-217344, Mention may also be made, as synthetic rubber latex, on the other hand, of polybutadiene rubber, styrene-butadiene rubber, acrylonitrile-butadiene rubber, ethylene-vinyl acetate rubber, chloroprene rubber, vinyl pyridine rubber, and butyl rubber, and modified rubber latexes thereof. In particular, carboxylated styrene-butadiene rubber (C-SBR) latex is preferred because of its high stability. The natural rubber latexes and synthetic rubber latexes may be used alone, or two or more types thereof may be used in combination.

The rubber latex includes an aqueous medium containing a small amount of surfactant as an emulsifier and fine particles of solid rubber dispersed in the aqueous medium. The rubber latex to be used is usually adjusted to have a rubber solids content of approximately 40-70% by mass. Moreover, the amount of the rubber latex (rubber solids) per total mass (100% by mass) of the puncture sealant is preferably in the range of 15% to 40% by mass from the viewpoints of initial sealing performance and seal retention performance. The lower limit of the amount is more preferably not less than 18% by mass, while the upper limit thereof is more preferably not more than 35% by mass.

The tackifying resin emulsion is used to increase adhesion between the rubber latex and a tire and thereby improve puncture sealing performance. For example, a tackifying resin emulsion (oil-in-water emulsion) in which fine particles of a tackifying resin are emulsified and dispersed in an aqueous medium containing a small amount of emulsifier may be used. The tackifying resin to be used as the solids of the tackifying resin emulsion may preferably be one that does not, coagulate the rubber latex, such as terpene resin, phenolic resin, or rosin resin. Other preferred resins include polyvinyl esters, polyvinyl alcohols, and polyvinyl pyrrolidines The amount of the tackifying resin emulsion (the solids of the tackifying resin) for each 100 parts by mass of rubber solids in the rubber latex is preferably 5 to 80 parts by mass. If the amount is less than 5 parts by mass, the resulting puncture sealant may have insufficient puncture sealing performance and seal retention performance. Conversely, if the amount is more than 80 parts by mass, the resulting puncture sealant may have deteriorated storage properties because, for example, the rubber particles are likely to aggregate during storage; in addition, the puncture sealant may be difficult to inject through the air valve due to the increase in viscosity. The lower limit of the amount is more preferably not less than 15 parts by mass, while the upper limit thereof is more preferably not more than 40 parts by mass.

Suitable examples of the emulsifiers for the rubber latex and for the tackifying resin emulsion include surfactants such as anionic surfactants, nonionic surfactants, and cationic surfactants. The combined amount of these emulsifiers per total mass (100% by mass) of the puncture sealant is usually approximately 0.4-2.0% by mass.

The rosin acid surfactant is not particularly limited, and alkali metal salts of rosin acid can be suitably used because they provide good storage stability and puncture sealing performance. Rosin acid is generally obtained as a main component of rosin (resin) prepared by distillation of pine resin which is the sap of plants of Pinaceae, and contains abietic acid and its isomers. Examples of the alkali metal salts include salts of lithium, sodium, potassium, and cesium. Salts of potassium and of sodium are preferred because they provide excellent storage stability and puncture sealing performance.

Moreover, the rosin acid surfactant is preferably a disproportionated rosin acid surfactant because it has excellent stability and contributes to well achieving the effects of the present invention.

The amount of the rosin acid surfactant for each 100 parts by mass of rubber solids in the rubber latex is preferably 0.1 to 15 parts by mass. If the amount is less than 0.1 parts by mass, the resulting puncture sealant may have insufficient storage stability. Conversely, if the amount is more than 15 parts by mass, the resulting puncture sealant may show insufficient sealing performance and may also have an increased viscosity at room temperature. The lower limit of the amount is more preferably not less than 0.8 parts by mass, still more preferably not less than 2.5 parts by mass, and particularly preferably not less than 5 parts by mass. The upper limit thereof is more preferably not more than 10 parts by mass.

In the present invention, a nonionic surfactant is preferably used together with the rosin acid surfactant. This improves injectability at high temperatures and thus allows the puncture sealant to be suitably used in the aforementioned integrated repair systems as well.

The nonionic surfactant is not particularly limited, polyoxyalkylene alkyl ethers, polyoxyalkylene alkenyl ethers, and sulfates thereof (polyoxyalkylene alkyl ether sulfates, polycxyalkylene alkenyl ether sulfates) and the like can be suitably used because they provide good injectability at high temperatures, good storage stability, and good puncture sealing performance.

The polyoxyalkylene alkyl ether, polyoxyalkylene alkenyl ether, or sulfate thereof preferably has an ethylene oxide structure and/or a propylene oxide structure. Nonionic surfactants having an ethylene oxide structure and/or a propylene oxide structure as a hydrophilic group can enhance compatibility with an antifreezing agent such as propylene glycol. Nonionic surfactants having an ethylene oxide structure are preferred among these. When the nonionic surfactant has an ethylene oxide structure and/or a propylene oxide structure, the average number of moles of added ethylene oxide (EO) and propylene oxide (PO) (the sum of the average numbers of moles of added 50 and PO) is preferably not less than 10, and more preferably not less than 13. Also, the average number of moles is preferably not more than 80, more preferably not more than 60, and still more preferably not more than 40, In these cases, compatibility can be enhanced and injectability at high temperatures can be improved, and therefore the effects of the present invention can be well achieved.

Moreover, the number of carbon atoms in the alkyl group in the polyoxyalkylene alkyl ether or sulfate thereof, and the number of carbon atoms in the alkenyl group in the polyoxyalkylene alkenyl ether or sulfate thereof each are preferably not less than 10, and more preferably not less than 12. Also, the numbers of carbon atoms are each preferably not more than 20, and more preferably not more than 18. In these cases, injectability at high temperatures can be effectively improved, and therefore the effects of the present invention can be well achieved, The nonionic surfactant preferably has an HLB value (determined by Griffin's method) of not less than 12, more preferably not less than 13. The HLB value is also preferably not more than 19, and more preferably not more than 17. In these cases, compatibility can be enhanced and stability at high temperatures can be improved, which can result in improved storage properties and improved injectability at high temperatures. Additionally, excellent puncture sealing performance, seal retention performance, and low-temperature properties can be achieved.

Examples of commercially available nonionic surfactants include EMULGEN 320P, EMULGEN 420, EMULGEN 430, EMULGEN 150, EMULGEN 109P, EMULGEN 120, and EMULGEN 220 (all produced by Kao Corporation).

The amount of the nonionic surfactant for each 100 parts by mass of rubber solids in the rubber latex is preferably 1 to 12 parts by mass. The lower limit of the amount is more preferably not less than 5 parts by mass, while the upper limit thereof is more preferably not more than 8 parts by mass. The use of the nonionic surfactant within the range mentioned above can suitably improve injectability at high temperatures, and therefore contributes to well achieving the effects of the present invention.

When a nonionic surfactant is added, the combined amount of the rosin acid surfactant and the nonionic surfactant for each 100 parts by mass of rubber solids in the rubber latex is preferably 2 to 15 parts by mass. If the combined amount is less than 2 parts by mass, the resulting puncture sealant may have insufficient storage stability. Conversely, if the combined amount is more than 15 parts by mass, the resulting puncture sealant may show insufficient sealing performance and may also have an increased viscosity at room temperature. The lower limit of the combined amount is more preferably not less than 7 parts by mass, while the upper limit thereof is more preferably not more than 11 parts by mass.

In the present invention, an antifreezing agent is preferably used. Examples of antifreezing agents that can be used include, but are not limited to, ethylene glycol, propylene glycol (1,2-propanediol), and 1,3-propanediol. The use of ethylene glycol as an antifreezing agent may in some cases deteriorate the stability of the rubber particles and thus cause their aggregation. On the other hand, the use of propylene glycol or 1,3-propanediol as an antifreezing agent can prevent the rubber particles and the tackifier particles from aggregating around the surface of the puncture sealant and changing to creamy substances even after a long-term storage, so that excellent storage properties (storage stability) can be provided. Thus, the use of propylene glycol or 1,3-propanediol is preferred.

The amount of the antifreezing agent for each 100 parts by mass of rubber solids in the rubber latex is preferably 40 to 300 parts by mass. If the amount is less than 40 parts by mass, the resulting puncture sealant may have an insufficient viscosity at low temperatures. Conversely, if the amount is more than 300 parts by mass, the resulting sealant may have a reduced solids content and show reduced puncture sealing performance. The lower limit of the amount is more preferably not less than 70 parts by mass, while the upper limit thereof is more preferably not more than 150 parts by mass.

The puncture sealant of the present invention may further contain other ingredients as long as the effects of the present invention are not inhibited.

The puncture sealant of the present invention can be prepared by a conventional method. Specifically, the puncture sealant can be prepared, for example, by mixing the foregoing components and the like by a known method.

EXAMPLES

The present invention will be specifically described by reference to examples; however, the present invention is not limited thereto.

Preparation Example 1

A bacterial proteolytic enzyme was added to field latex (solids content: 30% by mass) and the mixture was allowed to stand at 40° C. for 24 hours to give a proteolytically degraded field latex. The field latex was purified with a rotary flat membrane separation system according to the method described in JP-B 3350593 and concentrated until the solids content reached 60% by mass. Thus, a deproteinized natural rubber latex was prepared, Examples 1 to 14 and Comparative Examples 1 to 10

Puncture sealants were prepared from a commercially available natural rubber latex (HA natural rubber latex made in Malaysia (rubber solids content: 60% by mass)), the prepared deproteinized natural rubber latex, or a synthetic rubber latex (SBR latex (LX112) produced by ZEON CORPORATION (rubber solids content: 50% by mass)) according to the formulations shown in Tables 1 to 3.

The following tackifying resin emulsion (tackifier) and surfactants were used.

Tackifier: Terpene resin emulsion (solids content: about 50% by mass)

RONDIS K-25: Disproportionated rosin surfactant (potassium salt, solids content: 25%, produced by ARAKAWA CHEMICAL INDUSTRIES, LTD.)

RONDIS N-18: Disproportionated rosin surfactant (sodium salt, solids content: 18%, produced by ARAKAWA CHEMICAL INDUSTRIES, LTD.)

EMULGEN 430: Polyoxyethylene oleyl ether (formula (1) where $R^1$=oleyl, x=30, y=0, HLB value=16.2, produced by Kao Corporation)

$$R^1\text{—O-(EO)}_x\text{(PO)}_y\text{—H} \tag{1}$$

EMULGEN 150: Polyoxyethylene lauryl ether (formula (1) where $R^1$=lauryl, x=40, y=0, HLE value=18.4, produced by Kao Corporation)

Emal 270J: Sodium polyoxyethylene lauryl ether sulfate (produced by Kao Corporation)

Emal 2FG: Sodium lauryl sulfate (produced by Kao Corporation)

The obtained puncture sealants were evaluated for puncture sealing performance, injectability at high temperatures, seal retention performance, storage properties (storage stability), and viscosity at low temperatures (−30° C.) by the methods described below. Tables 1 to 3 show the results, (1) Puncture Sealing Performance:

A puncture hole was made in a tire of size 185/65R14 using a nail having a diameter of 4.0 mm. After removal of the nail, 500 ml of a puncture sealant was injected into the tire and air pressure was applied up to 200 kPa. Thereafter, the tire was rotated at a load of 3.5 kN on a drum, and the time required for sealing the puncture hole was determined by measuring the amount of air leakage, and expressed as an index on a scale of 1-5, with 3 being given to a conventional product. A higher index indicates better performance, (2) Injectability at High Temperatures:

A sealant was injected into a tire with an integrated puncture repair system at a temperature of 50° C. After the injection of the sealant, injectability at high temperatures was determined by measuring the increase in tire pressure. The results are rated on a 3-point scale: A (the pressure increased to a predetermined level (200 KPa)), B (the pressure increased to at least 100 MPa, but this pressure increase then stopped before reaching the predetermined level), and C (the pressure increase did not even reach 100 MPa).

(3) Seal Retention Performance:

The aforementioned tire was checked for air leakage from the puncture hole during 100 km of running after the sealing. The results are rated on a 2-point scale: A (no air leakage occurred) and a (air leakage occurred).

(4) Storage Properties (Storage Stability)

After the prepared puncture sealants were allowed to stand for 10 days at a temperature of 70° C., the changes in state of the puncture sealants were visually evaluated on a 4-point scale: S (remained liquid), A (changed to be slightly creamy), B (changed to be creamy), and C (solidified).

(5) Viscosity at Low Temperatures (−30° C.)

The viscosity of each puncture sealant at −30° C. was measured with a type B viscometer (Brookfield viscometer).

TABLE 1

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Commercially available natural rubber latex (solids content: 60% by mass) |  | 55 (33) | 55 (33) | 55 (33) | 55 (33) | 55 (33) | 55 (33) | 55 (33) | 55 (33) | 55 (33) | 55 (33) |
| Tackifier (solids content: 50% by mass) |  | 15 (7.5) | 15 (7.5) | 15 (7.5) | 15 (7.5) | 15 (7.5) | 15 (7.5) | 15 (7.5) | 15 (7.5) | 15 (7.5) | 15 (7.5) |
| Propylene glycol |  | 30 | 30 | 30 | 30 | 30 | 30 | 30 | 30 | 30 | 30 |
| RONDIS K-25 |  | 0.3 | 1 | 2 | — | 1 | 1 | — | — | — | — |
| RONDIS N-18 |  | — | — | — | 2 | — | — | — | — | — | — |
| EMULGEN 430 |  | — | — | — | — | 2 | — | — | 2 | — | — |
| EMULGEN 150 |  | — | — | — | — | — | 2 | — | — | — | — |
| Emal 270J |  | — | — | — | — | — | — | — | — | 2 | — |
| Emal 2FG |  | — | — | — | — | — | — | — | — | — | 2 |
| Results | Puncture sealing performance | 4 | 5 | 5 | 5 | 4 | 4 | 3 | 3 | 3 | 3 |
|  | Injectability at high temperatures | B | B | B | B | A | A | A | A | C | C |
|  | Seal retention performance | A | A | A | A | A | A | A | A | A | A |
|  | Storage properties | S | S | S | S | S | S | S | S | S | S |
|  | Viscosity at −30° C. (cps) | 780 | 820 | 860 | 840 | 910 | 930 | 780 | 770 | 1120 | 1210 |

TABLE 2

|  |  | Example 7 | Example 8 | Example 9 | Example 10 | Example 11 | Example 12 | Comparative Example 5 | Comparative Example 6 | Comparative Example 7 | Comparative Example 8 |
|---|---|---|---|---|---|---|---|---|---|---|---|
| Deproteinized natural rubber latex (solids content: 60% by mass) |  | 55 (33) | 55 (33) | 55 (33) | 55 (33) | 55 (33) | 55 (33) | 55 (33) | 55 (33) | 55 (33) | 55 (33) |
| Tackifier (solids content: 50% by mass) |  | 15 (7.5) | 15 (7.5) | 15 (7.5) | 15 (7.5) | 15 (7.5) | 15 (7.5) | 15 (7.5) | 15 (7.5) | 15 (7.5) | 15 (7.5) |
| Propylene glycol |  | 30 | 30 | 30 | 30 | 30 | 30 | 30 | 30 | 30 | 30 |
| RONDIS K-25 |  | 0.3 | 1 | 2 | — | 1 | 1 | — | — | — | — |
| RONDIS N-18 |  | — | — | — | 2 | — | — | — | — | — | — |
| EMULGEN 430 |  | — | — | — | — | 2 | — | — | 2 | — | — |
| EMULGEN 150 |  | — | — | — | — | — | 2 | — | — | — | — |
| Emal 270J |  | — | — | — | — | — | — | — | — | 2 | — |
| Emal 2FG |  | — | — | — | — | — | — | — | — | — | 2 |
| Results | Puncture sealing performance | 4 | 5 | 5 | 5 | 4 | 4 | 3 | 3 | 3 | 3 |
|  | Injectability at high temperatures | B | B | B | B | A | A | A | A | C | C |
|  | Seal retention performance | A | A | A | A | A | A | A | A | A | A |
|  | Storage properties | S | S | S | S | S | S | S | S | S | S |
|  | Viscosity at −30° C. (cps) | 810 | 840 | 880 | 850 | 910 | 940 | 770 | 780 | 1150 | 1220 |

TABLE 3

|  |  | Example 13 | Example 14 | Comparative Example 9 | Comparative Example 10 |
|---|---|---|---|---|---|
| Synthetic rubber latex (solids content: 50% by mass) |  | 50 (25) | 50 (25) | 50 (25) | 50 (25) |
| Tackifier (solids content: 50% by mass) |  | 15 (7.5) | 15 (7.5) | 15 (7.5) | 15 (7.5) |
| Propylene glycol |  | 30 | 30 | 30 | 30 |
| RONDIS K-25 |  | 2 | — | — | — |
| RONDIS N-18 |  | — | 2 | — | — |
| EMULGEN 430 |  | — | — | 2 | — |
| EMULGEN 150 |  | — | — | — | — |
| Emal 270J |  | — | — | — | 2 |
| Emal 2FG |  | — | — | — | — |
| Results | Puncture sealing performance | 5 | 5 | 3 | 3 |
|  | Injectability at high temperatures | B | B | A | C |
|  | Seal retention performance | A | A | A | A |
|  | Storage properties | S | S | S | S |
|  | Viscosity at −30° C. (cps) | 1210 | 1270 | 1110 | 1160 |

As shown in Tables 1 to 3, the sealants of the examples, which contain rubber latex, a tackifying resin emulsion, and a rosin acid surfactant, show excellent storage stability and puncture sealing performance and also perform well in terms of injectability at high temperatures, seal retention performance, and viscosity at low temperatures. The sealants of Examples 5 to 6 and 11 to 12, which further contain a nonionic surfactant (e.g. EMULGEN 430), show excellent injectability at high temperatures.

In contrast, the sealants of the comparative examples, which contain no rosin acid surfactant, are inferior in puncture sealing performance.

The invention claimed is:

1. A tire puncture sealant, comprising:
   natural rubber latex,
   a tackifying resin emulsion, and
   a disproportionated rosin acid surfactant,
   wherein an amount of the natural rubber latex (rubber solids) per total mass (100% by mass) of the puncture sealant is 15% to 40% by mass,
   the tackifying resin emulsion is contained in an amount of 5 to 80 parts by mass as a solid of a tackifying resin for each 100 parts by mass of rubber solids in the natural rubber latex,
   the disproportionated rosin acid surfactant is contained in an amount of 0.1 to 15 parts by mass for each 100 parts by mass of rubber solids in the natural rubber latex,
   the tackifying resin is at least one selected from the group consisting of terpene resin, phenolic resin, and rosin resin, and
   the rosin acid surfactant is an alkali metal salt of a rosin acid, and the rosin acid comprises at least one selected from the group consisting of an abietic acid and an isomer of abietic acid.

2. The tire puncture sealant according to claim 1, comprising an antifreezing agent.

* * * * *